May 5, 1942.  W. BOE ET AL  2,281,868
REEL FOR LINE WASHING AND DRYING
Filed June 21, 1939
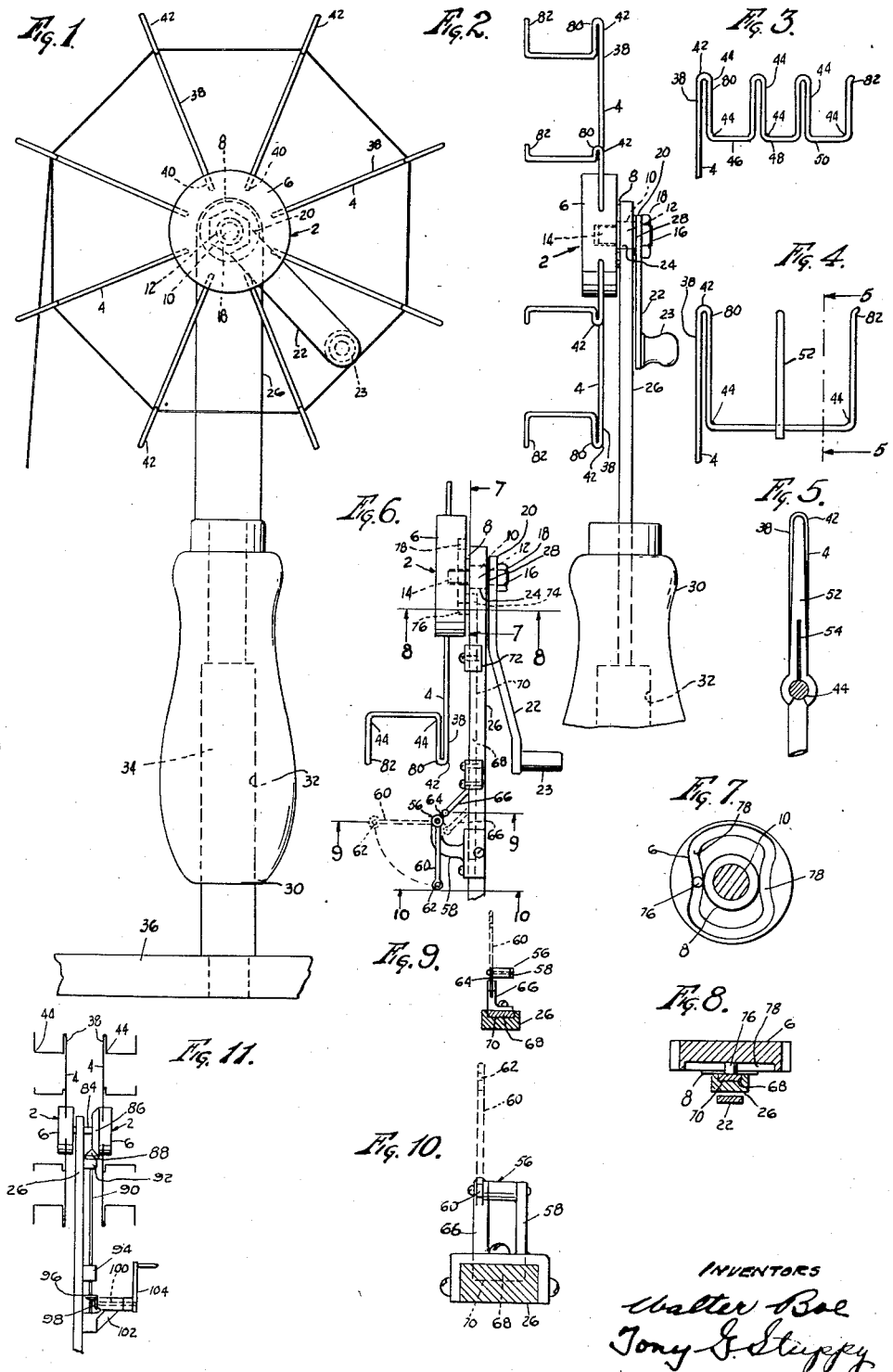
INVENTORS
Walter Boe
Tony G. Stuppy Patented May 5, 1942

2,281,868

UNITED STATES PATENT OFFICE 2,281,868

REEL FOR LINE WASHING AND DRYING

Walter Boe and Tony G. Stuppy,
San Gabriel, Calif.

Application June 21, 1939, Serial No. 280,316

3 Claims. (Cl. 242—104)

Our invention relates to line reels and more particularly to the special apparatus adapted for reeling thereon a line, such as fishing line, measuring or tape line or the like, which may be adapted for washing and drying said line, in order to prevent its deterioration, kinking or breaking and therefore retaining its strength and prolonging its usefulness.

In the present usage, a line, such as the fishing line, when used in the sea or muddy waters, becomes impregnated with salts and silt, or other foreign matter, causing it to become hardened, becomes mildewed if not properly cared for, then the line fibre becomes brittle and weak in its texture, so that it breaks at a comparatively light pull or load, also, when such line is used for measuring the depths of wells, such as oil, water or gas wells, in seeking the oil, water or gas depths or positions, said line without proper care in short time becomes impaired in strength, consequently becomes useless and in many instances it presents a problem because of its replacing value.

To that end a principal object of our invention is to provide line reeling apparatus, which is simple in construction, having a plurality of suitable line collecting means adapted for winding and collecting said line thereon, also for exposing all line surfaces toward or into the cleansing elements of whatever nature they might be and allowing said line to be thoroughly cleansed, rinsed and dried, so that its original strength may be retained, its usefulness prolonged and in addition, providing means for checking said line before or after it is used or reeled upon the fishing or other suitable reel having it in readiness for use.

A further object of our invention is to provide said line reeling apparatus of novel construction and provided with a suitable handle bar means which has an extension, one end of which is adapted to receive and hold said line reeling appparatus which is rotatably mounted thereon, so that it may be freely rotated thereon by means of a suitable crank and thereby allowing said line, or a tape measure, to be deposited thereon in layers and be used therefrom for the purpose of cleansing, washing, drying, checking or measuring, as the case might be.

Another object of our invention is to provide said line reeling apparatus with suitable guiding means adapted for guiding said line uniformly thereon into proper place and in layers while reeling it on and thereby preventing it from piling on and collecting at one place and therefore preventing its tangling.

A further object of our invention is to provide said apparatus with a line reeling means which is equipped with more than one line collector rod and having suitable guiding means adjustably mounted thereon, so that a number of said lines, or measuring tapes may be reeled thereon, without interfering with each other.

Another object of our invention is to provide said apparatus with a pair of reels, which are disposed at each side of the reel handle member, having a suitable crank means attached thereto and connected with said reels, adapted for revolving said reels upon its axis, as and when required.

Other and further objects and advantages of our invention as will hereinafter more fully appear, we attain by the construction herein shown on the drawing and described in the specification, forming a part of our application.

Reference is had to the accompanying drawing, in which the similar reference characters denote the similar parts.

In the drawing:

Fig. 1 is the front elevational view of the line reeling device, showing it provided with a handle and positioned upon a stand, wherefrom it may be detached, as required.

Fig. 2 is the side elevational view of the line reel taken from the right of the Fig. 1, showing a portion of the handle.

Fig. 3 is the side elevational and fragmentary view of the line reel collector end, showing it divided into a number of sections, shown in modified form.

Fig. 4 is the side elevational and the fragmentary view of the line reel collector ends, showing an adjustable guide member in place, shown in modified form.

Fig. 5 is the slightly enlarged end elevational and the cross-sectional view of the line reel collector end, showing the adjustable guide member in place, taken on the line 5—5 of the Fig. 4.

Fig. 6 is the fragmentary side elevational view of the line reel, showing the line winding control in position.

Fig. 7 is the partly cross-sectional and partly elevational view of the shaft and the cam member, taken on the line 7—7, of the Fig. 6.

Fig. 8 is the transverse cross-sectional view of the cam member and the handle extension, showing the roller and the cam guide in place, taken on the line 8—8 of the Fig. 6.

Fig. 9 is the transverse cross-sectional view of the handle extension and the guide bracket, taken on the line 9—9, of the Fig. 6.

Fig. 10 is the transverse cross-sectional view of the handle extension, slightly enlarged, showing the guide and the bracket in place, taken on the line 10—10, of the Fig. 6.

Fig. 11 is the side elevational view of the line reeling apparatus, in modified form, showing the double reel members associated therewith and having suitable means for revolving same.

Describing our invention more in detail, said invention comprises a reel, generally designated by numeral 2, comprising a plurality of line collectors 4 which are mounted upon a hub member 6 having a suitable shoulder member 8 the center section of which is provided with a detachable stub shaft 10.

Said stub shaft 10 is provided at its center with a shoulder 12, of which one end, as at 14, is screwed into said hub member 6 while the other end 16 is longer and suitably threaded for receiving thereon the nut member 18 and the top end 20 of the crank member 22 which extends downwardly and terminates with a suitable knob member 23.

The center shoulder 12 is rotatably disposed within a bearing hole 24 of the handle bar extension 26 and is held supported therein by means of a side washer 28 for preventing its binding. Also, the said handle bar extension 26 is extended downwardly as shown, in Figs. 1 and 2, beyond the extending edges of the collector 4 and provided with a suitable handle 30, the center section of which is provided with a hole 32 for receiving therein the stub end 34 of the stand member 36.

The line collectors 4 comprise an extension member 38 the extreme end of which is placed within a suitable socket or hole 40 disposed within the outer side surface of said hub 6 and extending radially therefrom, for forming a spider-like structure, see Fig. 1.

The uppermost end 42 of said collector 4 is bent for forming a U-shaped structure as at 44, upon which the line may be reeled, also, as shown in Fig. 3, said end 42 may be provided with any number of bends 46, 48, and 50, forming sections, which may be used for reeling individual lines thereon, or lines the length of which may designate a desired number of feet in length; further, for the same purpose, the bottom section 44 may, if so desired, be provided with a replaceable finger member 52 which is partly split as at 54 for providing tension with which it may be held fast thereon, as shown in Figs. 4 and 5.

It may be noted, that the stub shaft 12 may be made of any desired length, for accommodating the thickness of the hub 6 and for rendering said reel 2 removable (not shown) so that after reeling the line thereon, it may be taken off and replaced for new, without disturbing or disarranging the handle extension 26 or the crank member 22.

In order to reel the line uniformly upon said U-shaped bend 44 of the collector 4, a suitable line control 56 is provided, see Fig. 6, which is pivotally mounted upon a bracket 58, having a line control link member 60 provided with an opening or an eyelet 62 wherethrough the line may pass, also having a link 64 hingedly connected to the actuating bracket 66 which is mounted upon the control rod member 68.

Said rod member 68 is slidably disposed within a longitudinal groove 70 of the handle extension 26 and held therein in place by means of the bracket 58 and supported by a suitable clamp bracket 72, having the end 74 of said rod member 68 provided with a roller 76 which is disposed within the cam groove 78, see Figs. 7 and 8, formed at the corresponding side of said hub member 6, so that, when turning said crank 22, said hub member 6 will turn accordingly, causing said cam groove 78 to assume positions which will in its movement cause said roller 76 to follow, thus actuating said link member 60 so that the line may be reeled thereon between the upright ends 80 and 82, of the collector 4.

In the Fig. 11, said handle extension member 26 is provided with a pair of reels 2, each mounted upon a cross shaft 84, which may be removable if so required.

Said shaft 84 is provided with a suitable bevel gear 86 which is held in mesh with a pinion gear 88 mounted upon a gear shaft 90 held in place by means of bearings 92 and 94, the end of said gear shaft being provided with a suitable end bevel gear 96 adapted to inter-mesh with a corresponding bevel gear 98, having a crank shaft 100 mounted within a bracket 102 and to which a suitable crank 104 is attached.

As shown in Fig. 11, both reels 2 may be revolved as required for reeling the line thereon, then, should it be found necessary, either one may be removed and another substituted therefor, so that a number of reels 2 may be used and be attached for reeling the line thereon and therefore saving considerable time, particularly when handling a measuring line for the well depths which line or tape measure in many instances ranges to several thousand feet in length.

While we have thus described our invention with great particularity, it will be clear that the same may be modified throughout a wide range.

We accordingly do not propose to be limited to the exact details of construction herein shown on the drawing and described in the specification, but reserve the right in practice to make the changes and modifications therein, which may come within the scope of the appended claims.

We claim as our invention:

1. In the line reeling apparatus of the class described, a handle having an extension, a detachable hub member means having a stub shaft revolubly mounted within the end of said extension, a plurality of extension member means disposed in said hub member means extending radially therefrom and each extension member means terminating with a U-shaped bend for collecting the line thereon, a crank member means connected to said stub shaft for revolving said hub member means with said extension member means about its center and for reeling said line thereon, a cam groove means disposed in said hub member means, and line controlling means associated with said cam groove means and connected to said extension of said handle for guiding and for controlling the position of said line upon said U-shaped bends, substantially as described.

2. In a line reeling apparatus of the class described adapted for reeling the line thereon, a handle having an extension member and a bearing disposed at its end, a cross shaft means revolubly mounted within said bearing at said extended end having the shaft ends protruding through said bearing; a line collector means, said line collector means comprising, a hub member mounted upon one end of said extended shaft means, a plurality of extension member means mounted upon said hub member means each extending radially therefrom, a U-shaped bend disposed at the end of each radially extending member means for collecting the line thereon; a plurality of adjustable finger means each adjustably positioned upon one of said U-shaped bends for dividing and for adjusting the width of said U-shaped bends and for collecting more than one line length thereon; and a manually operable rotating means connected to the other extended end of said cross shaft means for controlling the revolving movement of said line collector means, substantially as described.

3. In the line reeling apparatus of the class described adapted for collecting the line thereon, a handle having an extension and a bearing at its end, a cross shaft member revolubly mounted within said bearing and at the extended end of said handle extension, a pair of hub members detachably mounted one at each end of said cross shaft member, a plurality of line collectors mounted upon each of said hub members and radially extending therefrom for receiving said line thereon, a pair of bevel gears associated with at least one of said hub members for revolving said line collectors about the center, a drive shaft member extending parallelly to said handle extension having one end connected to one of said bevel gears for controlling the rotation of the hub members together with said line collectors, a bearing bracket member connected to said handle extension for holding said drive shaft member in place and for holding said bevel gears of said line collectors in mesh, a bracket member having a bearing and positioned at the lower end of said handle extension for holding in place the downwardly extending drive shaft end, a driving shaft member mounted rotatably within the bearing of said bracket, a pair of bevel gears connecting the downwardly extending end of said drive shaft and the end of said driving shaft for transmitting the revolution of said shafts to the hub members and said line collectors, and a crank member connected to the free end of said driving shaft for driving and revolving said hub members and said line collectors at the extended end of said handle extension, substantially as described.

WALTER BOE.
TONY G. STUPPY.